United States Patent [19]
Abbes et al.

[11] Patent Number: 5,191,323
[45] Date of Patent: Mar. 2, 1993

[54] REMOTE POWER ON CONTROL DEVICE

[75] Inventors: Gilles Abbes; Eric Lamboley; Thierry Roman, all of Nice; Pierre Vachee, La Gaude, all of France

[73] Assignee: International Business Machines Corporation, Armonk, N.Y.

[21] Appl. No.: 681,611

[22] Filed: Mar. 25, 1991

Related U.S. Application Data

[63] Continuation of Ser. No. 435,105, Nov. 13, 1989, abandoned.

[30] Foreign Application Priority Data

Dec. 13, 1988 [EP] European Pat. Off. ......... 88480097.0

[51] Int. Cl.$^5$ .............................................. H04B 1/00
[52] U.S. Cl. ........................... 340/825.37; 340/825.31; 340/825.34
[58] Field of Search ............. 340/825.31, 825.34, 340/825.37, 825.32; 379/95, 98, 102, 104, 105, 106

[56] References Cited
U.S. PATENT DOCUMENTS

| | | | |
|---|---|---|---|
| 4,479,112 | 10/1984 | Hirsch | 340/825.8 |
| 4,546,213 | 10/1985 | Dick | 379/95 |
| 4,661,991 | 4/1987 | Logemann | 340/825.31 |
| 4,679,226 | 7/1987 | Muehleisen | 379/102 |
| 4,701,946 | 10/1987 | Oliva et al. | 379/102 |
| 4,831,648 | 5/1989 | Nishino | 379/95 |
| 4,876,717 | 10/1989 | Barron et al. | 340/825.34 |

*Primary Examiner*—Donald J. Yusko
*Assistant Examiner*—Dervis Magistre
*Attorney, Agent, or Firm*—Edward H. Duffield

[57] ABSTRACT

The remote power On devices used for powering a system from a remote console, to restart the system after a power failure. The remote console is connected to the system through switched network and autoanswer modem. When the connection is established the ring indicator signal of the modem interface is provided to the power control system controlling the power distribution in system. In response to this signal, the system service processor is powered on so that it is able to send messages to console inviting an operator to enter a password authorizing the general power on of the system. The password entered by the operator is sent to processor, checked and if it is correct the general power on of the system occurs. If not, the function is cancelled. In addition, the function may be inhibited at the remote system. This insures that the remote powering function is performed safely.

6 Claims, 4 Drawing Sheets

REMOTE POWER ON CONTROL DEVICE

This application is a continuation of our prior application Ser. No. 07/435,105 filed Nov. 13, 1989, now abandoned, which claimed priority under 35 USC 119 of the European application serial number 88480097.0 filed Dec. 13, 1988 whose priority is continued and claimed in the present application.

DESCRIPTION OF THE INVENTION

1. Field of the Invention

The present invention relates to a device for powering ON a machine remotely, through a service processor, ensuring that the operation is made safely.

2. Background Art

The remote power ON function exists in different types of machines. For example, large central processing units are provided with a local console having a key, the actuation of which controls the powering ON and OFF of the unit.

In other systems, the remote power ON function is performed through an auto answer modem by sending a message to the machine to be powered ON through a remote console. The receiving modem recognizes the message and activates a switch to power ON the machine.

The article published in the IBM Technical Disclosure Bulletin in May 1987 at pages 5536 and 5537 describes a remote power control system, wherein the terminal controllers are provided with a remote power ON control feature, so that they may be powered ON and OFF by a host processor without using any new commands dedicated to this specific function.

All these systems suffer from a major drawback, since no check is made to assure that the remote power ON function can be safely carried out.

OBJECTS OF THE INVENTION

An object of the present invention is to provide an improved device which performs the remote power ON function of a machine while assuring that there is no danger for a person who may be repairing or working on the machine.

Another object of the present invention is to provide such an improved device which allows the power ON function to be carried out only under control of authorized persons.

BRIEF SUMMARY OF THE INVENTION

The function of the device according to the subject invention is to power a system from a remote console, which is connected to the system through the switched network and an autoanswer modem. The modem provides a ring indicator signal to the system when the connection between the remote console and the autoanswer modem is established. The device is characterized in that it comprises:

power activating means responsive to the ring indicator signal to set active a first power activating signal, remote power control means which are responsive to the active status of the first power activating signal for sending a message through the established connection to the remote console, said message being displayed on the remote console screen to prompt the operator at the remote console to enter a password authorizing the general power ON of the system, the entered password being received by said remote power control means, which generates a second power activating signal when said power control means recognizes that the received password is authorized, said second power ON activating signal controlling the general power ON of the system, function cancelling means providing a function cancelling signal which causes the power acticating means to set inactive the first power activating signal, when the remote power control means recognizes that the entered password is not authorized.

DETAILED DESCRIPTION OF THE PREFERRED EMBODIMENT

Figure 1:
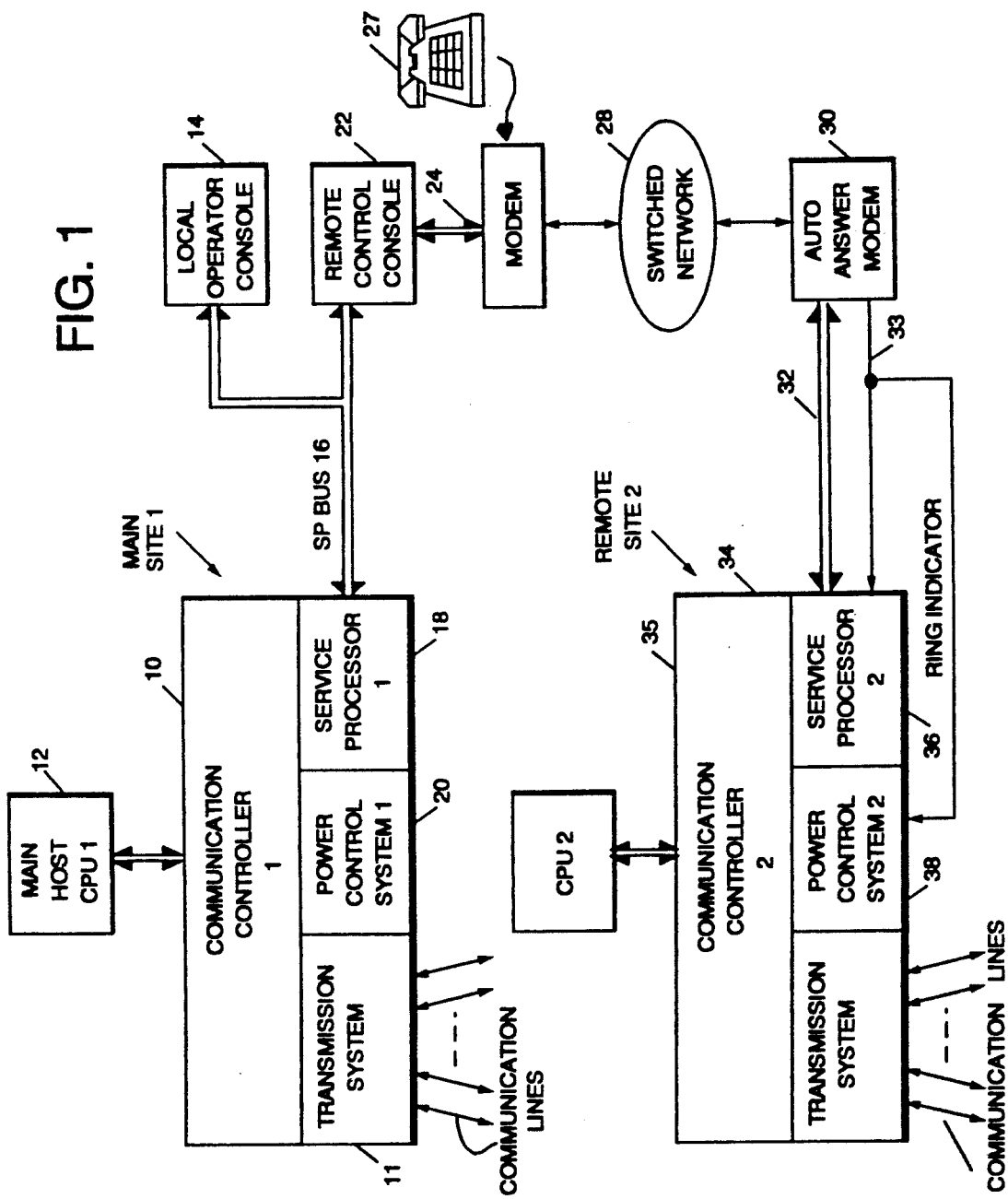
FIG. 1 represents the block diagram of two nodes of a communication network, wherein one communication controller is powered from a remote console according to the present invention.

The present invention will be described as implemented in a communication controller of the IBM 3745 type. Machines of such type are located at nodes of communication networks. There are different types of nodes. Two types are shown in FIG. 1. At a main site 1, the communication controller 10, which is attached to a main host CPU 12 is provided with a local operator console 14 which is attached through a SP bus 16 to a service processor 18 of the controller. The transmission system 11 of the controller is attached to communication lines so that network users may send/receive data to/from other network users or applications in the main host or hosts located in other nodes.

The communication controller components are powered through a power control system 20 which comprises a microprocessor to manage the powering ON and OFF of distributed power supply blocks, each block powering given components of the controller.

At this main site 1, a remote control console 22 is also provided, which is used by the operator to check and supervise the operation of the communication controllers located at remote sites. This console communicates with the remote controllers through a link comprising the bus 24, the modem 26, the switched network 28, the autoanswer modem 30 and the bus 32.

By dialing the telephone number of the remote controller 34 on telephone set 27, the connection with the service processor 36 of this controller is established in a conventional way through the switched network. Modem 30 recognizes its number, the ring indicator circuit of the modem repeats the ring pulses, and at the third pulse, connects the autoanswer modem 30 to the calling modem 26, thus establishing the connection. Controller 34 is connected to communication lines through its transmission system 35.

The interface bus 32 between modem 30 and service processor 36 comprises a number of wires as conventional, one of these wires is the RING INDICATOR wire 33.

According to the present invention, RING INDICATOR wire 33 is provided to the power control system 38 of controller 34 to start the remote power ON function, as will be described in reference to FIGS. 2, 3 and 4.

Each controller at the network nodes runs a network control program. Thus, controller 10 at the main site knows from the control program the addresses of the inter node links with the controllers at other sites. So, if a power failure occurs at the remote site 2, the messages sent by controller 10 to controller 34 are not acknowledged, so that the network control program in controller 10 is aware that controller 34 is down and this state is displayed on console 22 through service processor 18. The operator may restart controller 34 as will be described in reference to FIGS. 2, 3 and 4 using the remote powering function according to the present invention.

Figure 2:
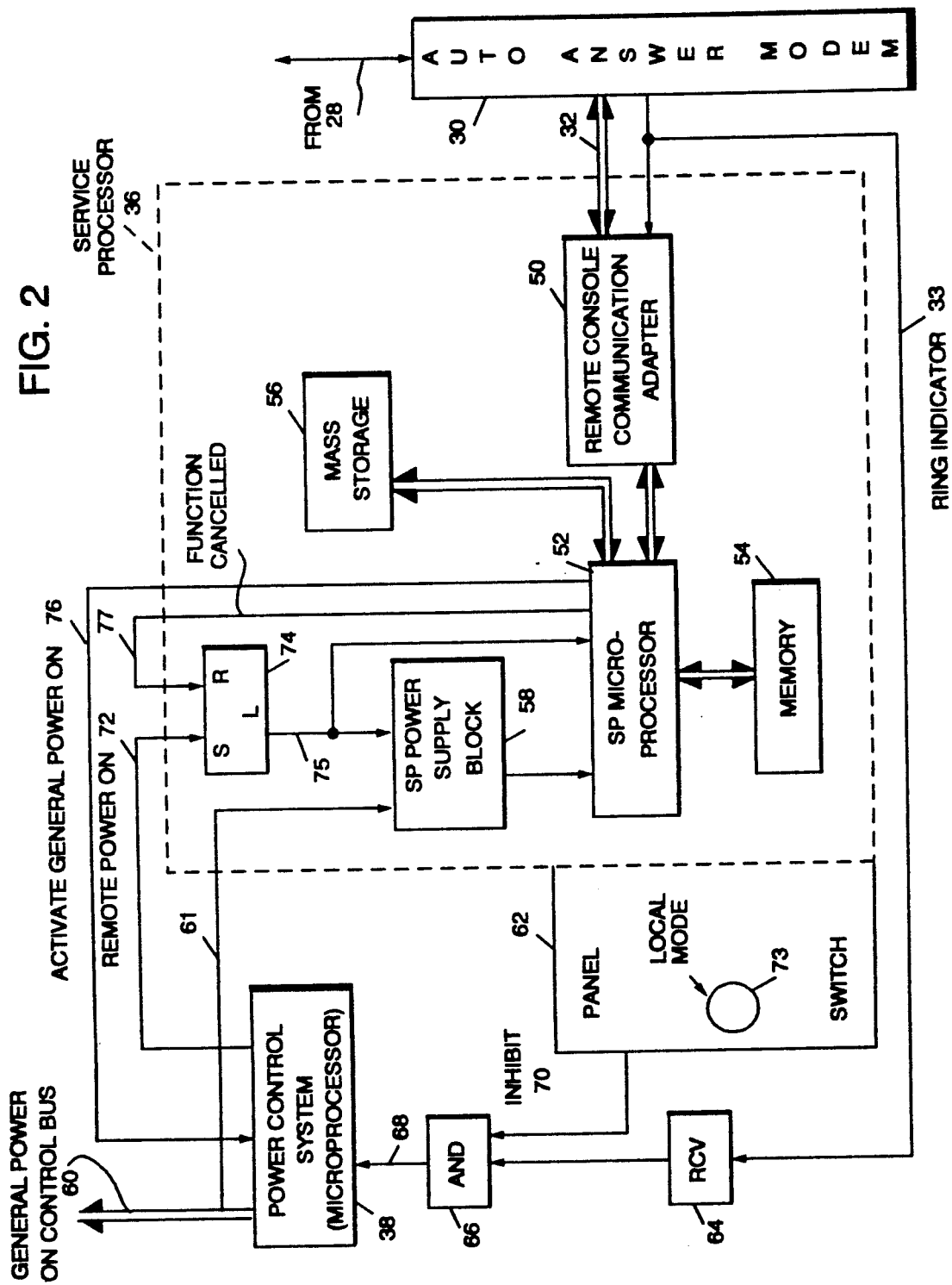
FIG. 2 shows the device which implements the remote powering function.

FIG. 2 only shows the parts of the remote communication controller which are involved in the embodiment of the present invention.

Remote console 22 is attached to service processor 36 through a remote console communication adapter 50 which makes the interface between auto answer modem 30 and a microprocessor 52. Microprocessor 52 is the major component of service processor 36, it carries out the maintenance, diagnostics and initial program loading of the controller 34. As conventional, microprocessor 52 is attached to a memory 54 and to a mass storage 56.

Service processor 36 has a separate power supply block 58 which is controlled by power control system 38 as every power supply block of the controller 34 by activation of one line 61 of bus 60.

Power control system 38 also comprises a microprocessor running a specific microprogram. This system is never powered OFF. Its major function is to power ON and OFF the distributed power blocks in the controller and block 58, through control bus 60.

The states of the power control system are the following:
  normal power ON state, (each power block is on)
  scheduled power ON state (in this state, the power blocks are powered on and off at given times)
  manual power ON (in this state, the power blocks are powered ON and OFF manually from the control panel 62)
  idle state (in this state, every block is powered OFF except the power control system block)

According to the present invention, the remote powering function is controlled by the ring indicator signal on line 33, which is provided on wire 33 to a receiver 64. The power control system is provided with an additional state: remote power state, which allows the remote powering function to be carried out as shown in FIG. 3.

When the ring indicator signal is received, AND gate 66 is conditioned and provides a signal on its output line 68 provided that inhibit line 70 is not active.

In a preferred embodiment of the invention, inhibit line 70 is activated from control panel 62, through switch 73 which is turned to the "local mode" position by the persons who may be working or repairing the controller 34.

The inhibit signal on line 70 prevents the remote powering function from being carried out, when it is activated.

In another embodiment of the invention, the inhibit signal may be activated when the controller housing is not perfectly closed.

Figure 3:
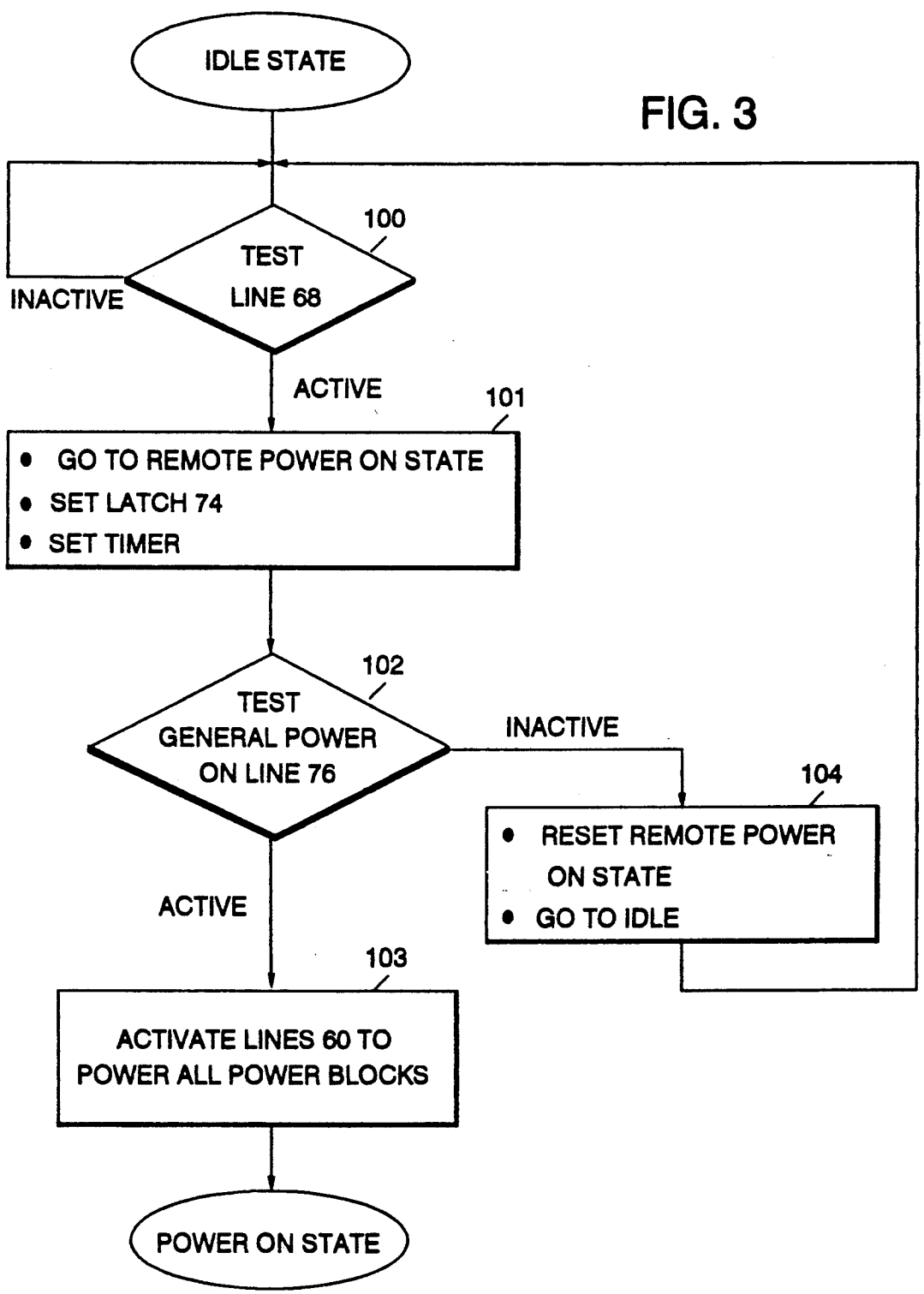
FIG. 3 shows the flow chart of the microprogram routine which is implemented in power control system 38 to carry out the present invention.

Power control system 38 is responsive to the activation of line 68 to start the remote power ON process shown in FIG. 3.

When latch 74 is set, service processor power supply block 58 is activated through signal on output line 75 of latch 74.

Microprocessor 52 is thus powered ON. It starts the general power ON process which results in the activation of line 76 or cancellation of the function by activating line 77. Activation of line 77 resets latch 74, as will be described in reference to FIG. 4, so that microprocessor 52 is no longer powered.

Line 75 is provided to one input of microprocessor 52. The general power ON process is started by the microprogram controlling microprocessor 52 when line 75 is activated.

Line 68 is one of the input lines of power control system microprocessor 38, which performs the microprogram steps shown in FIG. 3 to activate output lines 72 and 60, when line 76 becomes active.

In the preferred embodiment of the present invention, these operations are performed by microprogram, however any logic circuit which implements the functions shown in FIG. 3 could be used.

When controller 34 is down due to a power failure, power control system 38 is in idle state. The microprogram routine which implements the present invention is shown in FIG. 3.

First, at step 100, the state of line 68 is tested, when it is found active, step 101 is entered.

At step 101, power control system is set in remote power on state, line 72 is activated, which sets latch 74. In addition a timer is set to a value sufficient to allow the operations which have to be done by the operator from the remote control console, to be completed. Then, at step 102, line 76 is tested, if it becomes active before the time duration set by timer is elapsed, output lines 60 are activated to activate all power blocks of the controller 34, including block 58 (step 103). The power control system goes to its normal power on state.

If it is found inactive at the end of the time duration set by timer, the remote power ON state is reset at step 104 and the power control system goes to its idle state.

It will now be described in reference to FIG. 4, how the routine which is implemented by the microprogram controlling microprocessor 52 is to perform the remote power ON function.

This routine is entered when line 75 becomes active i.e., when latch 74 is set by the power control system 38. At step 110, service processor 36 starts the initial microcode loading IML operation, in a conventional way, so that it is able to send messages through the established link to remote control console 22. These messages are the following:
===>REMOTE POWER FUNCTION
===>TYPE YOUR PASSWORD At the same time, a timer is set to a value equal to the maximum duration normally required to perform the function (step 111).

The messages are displayed on the remote console screen. Only operators which are authorized to power ON the remote controller have a password which is stored in mass storage 56 of the remote controller.

The authorized operator types his/her password at the remote control console keyboard. The password is sent to microprocessor 52 through bus 32 and adapter 50.

The password is checked at step 112. If it is found that the password is incorrect, step 113 is entered. The following messages is sent to remote control console to be displayed on the screen:

===>PASSWORD INCORRECT
===>RETRY

The operator types his/her password, which is checked at step 114. If it is still incorrect, step 115 is entered. The following message is sent to the remote control console and displayed:

===>FUNCTION CANCELLED and line 77 is activated.

At step 112, it may be found that the password is expired and has to be changed.

In that case, step 116 is entered. The following message is sent to the remote control console:

===>CHANGE PASSWORD

Microprocessor 52 causes the password change to be performed in any conventional way. If the new password is not accepted at step 117, step 115 is entered. The function is cancelled and line 77 is activated.

The timer value is tested at step 118, when it is found that the time duration has elapsed, step 115 is also entered to cancel the function.

The operator who received the FUNCTION CANCELLED message may take the appropriate steps to have the remote controller repaired.

If it is found at steps 112, 114 and 117 that the passwords are correct, line 77 is tested at step 119. If it is found inactive, step 120 is entered. The following message is sent to the remote control console:

===>REMOTE POWER ON FUNCTION ACCEPTED

In addition, line 76 is activated. Thus, power control system activates lines 60 and the remote controller is powered ON.

After step 117, the new password is stored in mass storage 56.

The present invention has been more particularly described as incorporated in a communication controller system. However, it may be implemented in any system provided that the remote system to be powered, may be accessed from a console or terminal through a telephone link and an autoanswer modem.

Figure 4:
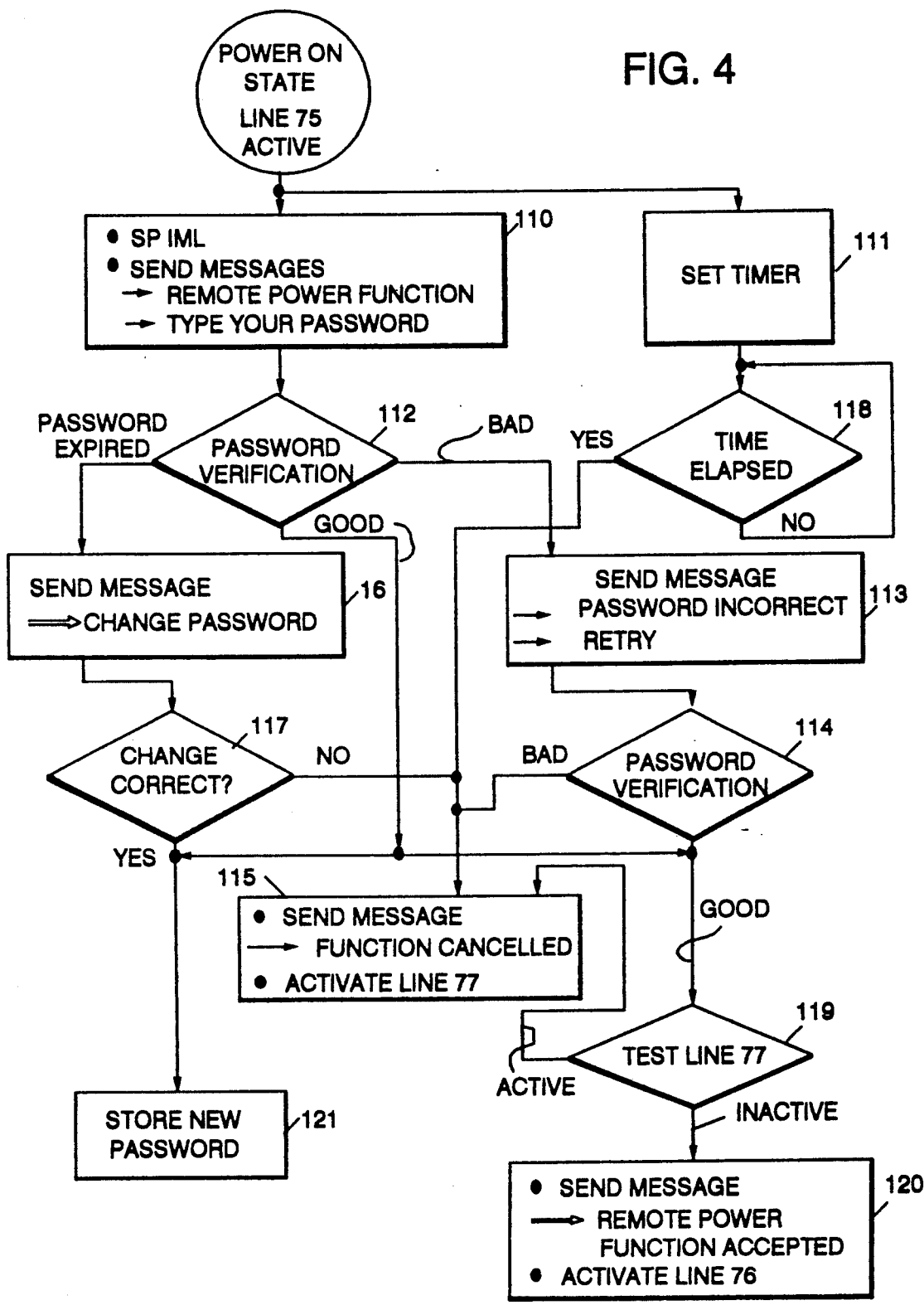
FIG. 4 shows the flow chart of the microprogram routine which is implemented in service processor 52 to carry out the present invention.

It will only be necessary to implement a power control system carrying out the functions shown in FIG. 3 to activate a device carrying out at least the functions shown in FIG. 4.

In any cases, since the ring indicator signal is received by a first receiver located in the remote console adapter 50 to be used as the ring indicator signal which is part of the modem interface and by receiver 64, the impedances of both receivers have to be adjusted to meet the standard specifications.

We claim:

1. A device for powering ON a computer system from a remote console (22) which can be connected to said system through a switched network (28) and an autoanswer modem (30) which provides a ring indicator signal to said system when a connection between said remote console and said autoanswer modem is established, said device being characterized in that it comprises:

a first general computer system power supply activating means (60) controlling the general power ON of said system when activated;

a second validation system power supply means (58), controlling the power ON of a remote power control means (74, 52) when activated by a first power activating signal;

power activating means (64, 66, 38) responsive to said ring indicator signal to set active said first power activating signal which activates said second validation system power supply means; and said remote power control means (74, 52) being powered ON by said second validation system power supply means when said first power activating signal is active, said power control means sending, when powered ON, a message through said connection to said remote console, said message being displayed at said remote console to prompt an operator to enter a password authorizing said general computer system power ON of said system, said password being received by said remote power control means which generates a second power activating signal when said remote power control means recognizes that said received password is authorized, said second power activating signal being provided to said first general computer system power supply activating means which activates said general power supply means in response thereto; and function cancelling means (77, 74) providing a function cancelling signal which causes said power activating means to set inactive said first power activating signal when said remote power control means recognizes that said password is not authorized.

2. A device according to claim 1 characterized in that said power activating means comprises:

receiving means (64) which receives said ring indicator signal, inhibiting means (62) which provide an inhibit signal when powering ON the system from said remote console is undesirable, general power control means (66, 38) which are responsive to said ring indicator signal from said receiving means, to said inhibit signal and to said second power activating signal, for generating said first power activating signal on a remote power ON control output line (72) when said inhibit signal is inactive, and providing a general power ON control signal on general power control output lines (60) in response to said second power activating signal.

3. A device according to claim 2, characterized in that said remote power control means (74, 58, 52) comprise:

latching means (74) having an output line (75), and being responsive to said active signal on said remote power ON control output line (72) to generate an active output signal on said output line and responsive to said function cancelling signal to generate an active signal on said output line, a separate power supply block (58), which is activated by said active signal on said output line of said latching means, or by a signal on said general power control output lines (60).

4. A device according to claim 3, characterized in that said remote power control means comprise:

service processor means (52) which are powered by said separate power supply block and are responsive to said active signal on said output line of said latching means, to send said message prompting the operator to enter said password, said service processor means being responsive to said received password to initiate a password recognition process.

5. A device according to claim 4, characterized in that said service processor means generates said second power activating signal on a general power ON activation output line (76) when said processor means recognizes that said received password is an authorized password and generates said function cancelling signal on a function cancelling output line (77) when said processor means recognizes that said received password is not authorized, said second power activating signal being provided to said general power control output lines (60) in response thereto.

6. A device according to claim 5, characterized in that said service processing means comprise timing means (118) which activate said function cancelling output line (77) when no correct password is received before the end of a fixed period.

* * * * *